United States Patent [19]
Funke et al.

[11] 3,812,368

[45] May 21, 1974

[54] ENERGY DEPOSITION CHEMICAL TRANSDUCER UTILIZED IN FLUERIC SENSING SYSTEM

[75] Inventors: Maurice F. Funke, Adelphi, Md.; James F. Bald, Jr., Jersey City, N.J.

[73] Assignee: The United States of America as represented by the Secretary of the Army, Washington, D.C.

[22] Filed: May 15, 1973

[21] Appl. No.: 360,701

[52] U.S. Cl.............. 250/432, 250/383, 204/158 R
[51] Int. Cl.............................................. G01t 1/00
[58] Field of Search ........... 250/474, 432, 339, 383; 204/158 R

[56] References Cited
UNITED STATES PATENTS

| | | | |
|---|---|---|---|
| 3,720,760 | 3/1973 | Bennich | 250/303 |
| 3,449,572 | 6/1969 | Sylvester | 204/158 R |
| 3,405,045 | 10/1968 | Hoskins | 204/158 R |
| 3,616,376 | 10/1971 | Marans | 204/158 |
| 3,655,982 | 4/1972 | Gelezunas | 250/432 |

*Primary Examiner*—Archie R. Borchelt
*Assistant Examiner*—Harold A. Dixon
*Attorney, Agent, or Firm*—Edward J. Kelly; Herbert Berl; Saul Elbaum

[57] ABSTRACT

Apparatus for quantitatively determining the presence of electromagnetic radiation, thermal energy or high energy particles in a controlled environment by exposing certain chemical compounds which generate active chemical species in response to exposure to such electromagnetic radiation, thermal energy or high energy particles. The presence of the active or volatile species causes a change in frequency in the output of a flueric oscillator connected to receive a mixture of a power supply fluid and the volatile species. The system includes a second flueric oscillator that has as its single input the power supply gas. The output from the two flueric osicllators are each delivered to a pair of electrical transducers that convert the fluid signals into proportional electrical signals. The electrical signals are fed in turn to readout instrumentation which provides a quantitative comparison of the electrical signals that is directly proportional to the quantity and temperature of the active chemical species and thus, to the level and/or intensity of thermal energy, electromagnetic radiation or high energy particles that produced same.

8 Claims, 2 Drawing Figures

PATENTED MAY 21 1974　　3,812,368

ENERGY DEPOSITION CHEMICAL TRANSDUCER UTILIZED IN FLUERIC SENSING SYSTEM

RIGHTS OF THE GOVERNMENT

The invention described herein may be manufactured, used, and licensed by or for the United States Government for governmental purposes without the payment to us of any royalties thereon.

BACKGROUND OF THE INVENTION

1. Field of the Invention

This invention relates generally to dosimeter devices and, more particularly, to an instrument that measures the amount of exposure to thermal energy, electromagnetic radiation or high energy particles that utilizes the ability of such radiation to produce a chemical reaction in certain chemical compounds.

2. Description of the Prior Art

Many prior art systems and devices have been utilized in attempts to gather reliable and accurate quantitative information about the levels and/or intensities of thermal energy, electromagnetic radiation, or high energy particles present in the atmosphere or in controlled environments. Instruments that measure the amount of exposure to nuclear or X-ray radiation that utilize the ability of such radiation to produce, for example, ionization of a gas are commonly referred to in the art as dosimeters. A typical prior art system utilizes as a primary reactant compounds of polymers which, when bombarded with radiation, give off hydrogen gas. The pressure of the resulting hydrogen gas will be proportional to the intensity of the radiation field in which it was produced. The foregoing type of dosimeter has a serious defect in that a remote readout of the pressure of the hydrogen gas is generally unavailable. Physical recovery and subsequent analysis of the dosimeter is required. To overcome the foregoing, pressure transducers have been incorporated in such dosimeters to provide a remote readout of the hydrogen gas pressure. However, this type of device generally requires the exposure of the electronic components of the pressure transducer to energy types and energy levels present in the radiation field that can seriously degrade signal quality. Moreover, prior art devices such as the foregoing are generally sensitive to all frequencies of a specific type of radiation and thus are unable to adequately distinguish between discrete energy levels. This shortcoming often requires further experimentation and analysis in order to obtain information pertaining to a specific frequency present in the radiation field. Furthermore, many of the prior art highly specialized dosimeters often require large exposure areas, and/or depend upon the production of dangerous radiation in an intermediate process.

SUMMARY OF THE INVENTION

It is therefore a primary object of the present to provide a simple method for the accurate quantitative measurement of various energy levels and intensities of thermal energy, electromagnetic radiation or high energy particles present in the atmosphere or in controlled environments.

Another object of the invention is to provide a rugged and compact apparatus for the accurate quantitative measurement of energy levels and/or intensities of various radiative fields located in the atmosphere or in controlled environments.

A further object of the invention is to provide apparatus for reliably and accurately gathering quantitative information on the levels and/or intensities of thermal energy, electromagnetic radiation or high energy particles present in the atmosphere or in controlled environments which is economical to construct, easy to use, and possesses the flexibility and versatility necessary for use in diverse environments.

A still further object of the present invention is to provide apparatus for obtaining quantitative information concerning the levels and intensities of quantities in a radiative field which provides a remote readout system which does not require the exposure of electrical components in signal degrading surroundings.

A still further object of the present invention is to provide dosimeter apparatus which includes detection and sensing means able to distinguish between discrete energy levels of the detected radiation.

Briefly, in accordance with the invention, apparatus for obtaining quantitative information on the level and/or intensity of thermal energy, electromagnetic radiation, or high energy particles present in the atmosphere or in a controlled environment is provided which comprises a chemical transducer that is placed within the radiative field desired to be measured. The chemical transducer contains a primary reactant that yields a volatile species or gas in response to exposure to thermal energy, electromagnetic radiation, or high energy particles. The chemical transducer has an input and an output port in communication with the chamber that contains the primary reactant. The input port receives a fluid power signal from a fluid power supply that is mixed in the reaction chamber with the volatile species produced therein and is fed through the output port to a flueric oscillator. The output signal of the oscillator has a frequency which is dependent upon the temperature of the gas and the volume fraction of the volatile species contained therein. This frequency signal is transduced into an electrical signal which is subsequently compared with another electrical signal which is the product of a similar flueric oscillator which has the power supply fluid as its only input thereto. Any difference is the detected signal frequencies will correspond directly to the reaction level of the chemical transducer, thus yielding a direct quantitative indication of the density of the radiation of interest.

BRIEF DESCRIPTION OF THE DRAWINGS

Various objects, features, and attendant advantages of the present invention will be more fully appreciated as the same becomes better understood from the following detailed description of the present invention when considered in connection with the accompanying drawings, in which.

DETAILED DESCRIPTION OF THE PREFERRED EMBODIMENTS

The concept of the present invention is centered around the use of various chemical species, hereinafter referred to as the primary reactants, which undergo breakdown or modification when exposed to either electromagnetic radiation, thermal energy, or high energy particles to produce volatile products. The volatile products produced thereby are intermixed with another gas, referred to hereinafter as the power supply gas. The resultant changes in the temperature and/or composition of the gas mixture brought about by the interaction of such energy with the primary reactant(s) is sensed by flueric sensing means as will be explained more fully hereinafter. One very desirable application of the foregoing concepts takes advantage of the fact that certain organic compounds, such alkyl nitrates and aliphatic carbonyls, undergo homolysis in the presence of ultraviolet irradiation of a specific wavelength. As examples of the foregoing, consider the following:

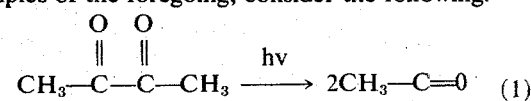   (1)

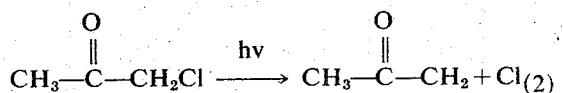   (2)

The free radical(s) produced in this manner can be utilized in one of two ways: (a) reaction with a suitable radical scavenger with which the radical can combine to form a volatile species; or (b) initiation of a free radical chain reaction, selected so as to ensure production of a volatile species. As mentioned above, the resultant change in the gas mixture composition comprising the power supply gas and the volatile species will be indicated by the flueric sensing means.

Additionally, the interaction of the free radical species with other chemical compounds will normally be exothermic in nature, and will lead to a change in the temperature of the gas mixture. This change can also be sensed by the flueric sensing means, as will be explained more fully hereinafter.

Numerous other organic compounds produce free radicals in the presence of thermal energy (heat) alone. Examples of such species include azo compounds, alkyl nitrates, and azoaceto nitriles. Normally with the foregoing, the free radical production will be initiated at a specific temperature. The resultant mixture of radical species and power supply gases could then be detected by the flueric sensing means to be outlined below.

Virtually all chemical compounds decompose at some point under the influence of thermal energy. Although free radicals are not always produced in many cases volatile species result directly. For example:

   3

The presence of pyridine vapor in the gas mixture will be indicated by the flueric sensing means. Organic compounds may also be converted to free radicals by high energy radiation, i.e., by the collision of an alpha, beta or gamma particle, or of an X-ray with a molecule. As long as a knowledge of the processes involved is available, such product radicals can be utilized as described above to produce changes in the gas mixture which are monitored by the flueric sensing means.

Figure 1:
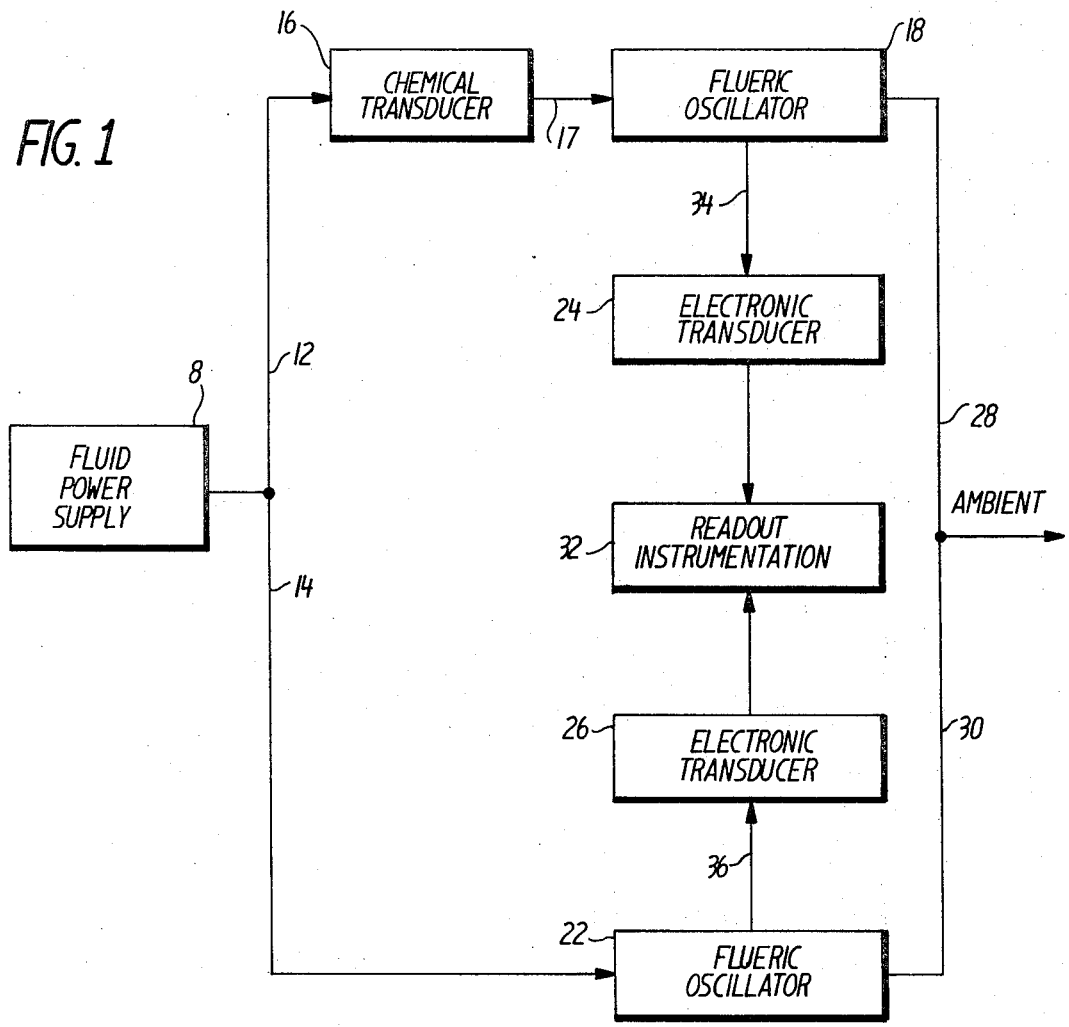
FIG. 1 is a block diagram of a preferred embodiment system constructed according to the principles of the present invention.

Referring now to the drawings, wherein like reference numerals designate identical or corresponding parts throughout the several views, and more particularly to FIG. 1 thereof, there is illustrated in block diagram form a preferred embodiment of the system comprising the present invention. A fluid power supply 8 feeds a power supply gas along conduit 12 to a chemical transducer 16. Chemical transducer 16 is located within the radiative field in the environment desired to be detected. Transducer 16 contains the primary reactants that undergo breakdown or modification when exposed to either radiation, thermal energy, or high energy particles, as desired, to produce the aforedescribed volatile products. The volatile products produced in chemical transducer 16 are combined in a chamber with the power supply gas from line 12 and the mixture is directed to flueric oscillator 18. Flueric oscillator 18 belongs to a class of well known flueric devices that produce an output pressure signal along line 34 in response to an input signal received along line 17. The frequency of the output signal along line 34 is dependent upon temperature according to the following equation:

$$f(T) = f(T_0) \quad T/T_0 \qquad 4$$

Wherein $T$ represents the absolute temperature of the gas in oscillator 18; $T_0$ is a reference temperature; $f(T_0)$ is a constant representing the frequency of oscillator 18 when the gas therein has a temperature $T_0$; and $f(T)$ is the frequency of the oscillator's output signal along line 34 at the temperature $T$. The output frequency of flueric oscillator 18 is also dependent upon the concentration level of a specific gas in a gas mixture, as evidenced by the following equation:

$$f_m = [1 + \phi \, (f_1/f_2 - 1)] f_2 \qquad 5$$

Wherein $\phi$ represents the volume fraction of the specific gas being sensed in the gas mixture; $f_1$ represents the output signal frequency of oscillator 18 with the specific gas as its sole input; $f_2$ is the frequency of the output signal of oscillator 18 if the carrier gas were its only input; and $f_m$ yields the frequency of oscillator 18 which has as its input a mixture composed of the specific gas and the carrier gas. Equation (5) is utilized in the present invention wherein the specific gas being sensed comprises the volatile products produced by the exposure of the primary reactants in chemical transducer 16, and the carrier gas refers to the fluid power supply gas emanating from fluid power supply 8. Thus, it is seen that if the frequencies $f_1$ and $f_2$ can be predetermined as the frequencies of oscillation of oscillator 18 with the volatile products alone and the power supply gas alone, respectively, and one can measure the output frequency $f_m$ of the mixtures of said gases, the volume fraction $\phi$ of the volatile products produced in chemical transducer 16 can be deduced according to equation (5). An example of a flueric oscillator that responds according to the foregoing equations and which is well known in the art can be found in Harry Diamond Laboratories' report TR-1428, April 1969, entitled "Flueric Temperature-Sensing Oscillator Design", by Gaylord and Carter.

Referring again to FIG. 1, it is seen that a second flueric oscillator 22 is provided in the system which has characteristics which correspond to those of flueric oscillator 18. If a power supply signal from fluid power supply 8 is simultaneously fed along conduit 14 to flueric oscillator 22, the frequency of the output signal along conduit 36 of flueric oscillator 22 will depend solely upon the properties of the fluid power supply gas, which may be, for example, air. The outputs of flueric oscillator 18 and flueric oscillator 22 are fed along conduits 34 and 36, respectively, to similar electronic transducers 24 and 26, respectively. Electronic transducers 24 and 26 may be comprised of, for example, well known piezoelectric transducers which convert a pressure input signal into a proportional electrical output signal. The electrical output signals of transducers 24 and 26 are then fed into various readout instruments 32 which may include, for example a digital comparator or counter that compares the two electrical inputs and provides a readout thereof. And excess gas mixture in flueric oscillators 18 and 22 passes through conduits 28 and 30, respectively, to the ambient.

It is seen by the foregoing that if there is no radiation present surrounding chemical transducer 16, the primary reactants located therein will not react, and the signal frequencies of oscillators 18 and 22 will be equal, thus providing equal electrical signals to readout instruments 32. Any difference in signal frequencies of flueric oscillators 18 and 22 will correspond to equations (4) and (5) above, and thus will correspond to the reaction level within chemical transducer 16, thus giving an indication of the density of the radiation of interest. It is appreciated that the electronic components of the foregoing system may be easily shielded or placed outside the high energy environment in which the reactions occur in order to prevent signal degradation.

Figure 2:
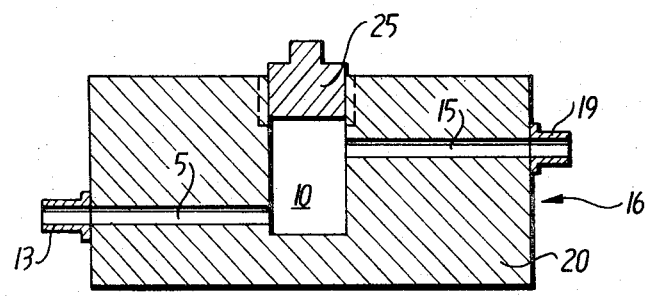
FIG. 2 illustrates a side sectional view of the chemical transducer utilized in the system of FIG. 1.

Referring now to FIG. 2, there is illustrated a side section of a possible configuration of chemical transducer 16 of the system of FIG. 1. Transducer 16 is seen to consist of a body 20, connectors 13 and 19, input channel 5, output channel 15, reaction chamber 10, and a plug or stopper 25. In operation, the power supply gas passes through channel 5 into chamber 10 where the primary reactant is located and the appropriate chemical reaction occurs. In order to minimize the gas pressure head loss as the gas passes through the reactant, the primary reactant chemical is preferably in a large granular form. From chamber 10, the gas mixture enters channel 15 wherefrom it is ducted to flueric oscillator 18. Connectors 13 and 19 serve to connect channels 5 and 15, respectively, to conduits 12 and 17 of FIG. 1. The primary reactant is placed in or removed from chamber 10 by removal of plug 25 from transducer body 20. A seal between chamber 10 and the external environment is affected when plug 25 is installed in transducer body 20.

Several variations of the preferred embodiments shown in FIG. 1 are possible. For example, a second chemical transducer containing a different reactant than that of the first transducer could be installed in conduit 14 which normally passes unreacted gas. If the reaction in the first transducer causes an increase in the frequency of oscillator 18, and the reaction in the second transducer causes a decrease in the frequency of oscillator 22, the combination of increase/decrease in the two monitoring channels would provide greater sensitivity for the radiation of interest.

Another variation involves utilizing different power supply gases for the two oscillators. The temperature of the two gases entering the system could be maintained equally by means of, for example, a heat exchanger. These gases would then act directly as the primary reactants, their properties changing when exposed to the radiation of interest. A still further variation can take advantage of the temperature change caused by the reaction within the chemical transducer. By utilizing heat transfer techniques, none of the gaseous mixture would enter the flueric sensor. This is advantageous should the resultant gas mixture from the chemical transducer contain corrosive, toxic, or otherwise obnoxious species.

Also, with reference to the chemical transducer of FIG. 2, the fabrication material of plug 25 and the body 20 could be selected so that the prime reactant(s) is shielded from energy levels which are not of interest. Plug 25 and transducer body 20 could be fabricated such that the energy from one direction only can reach the prime reactant, thus making the sensor even more sensitive in accordance with a selected direction of irradiation.

Obviously, other flueric or non-flueric sensors can be utilized to sense the change in gas mixture composition caused by the chemical transducers. Therefore, we wish it to be understood that we do not desire to be limited to the exact details of construction shown and described, for obvious modifications can be made by a person skilled in the art.

What is claimed as new and desired to be secured by Letters Patent of the United States is:

1. Apparatus for obtaining quantitative information on the level and/or intensity of thermal energy, electromagnetic radiation or high energy particles present in the atmosphere or in a controlled environment, which comprises:
   means for containing a primary reactant that yields a volatile species in response to exposure to thermal energy, electromagnetic radiation, or high energy particles; and
   a first flueric sensing means connected to said containing means for receiving said volatile species as an input thereto, said flueric sensing means having as its output signal a fluid oscillating signal whose frequency of oscillation is proportional to the temperature and amount of volatile species received therein.

2. The apparatus according to claim 1 further comprising a fluid power supply for feeding a fluid power signal as an input to said containing means.

3. The apparatus according to claim 2 further comprising a second flueric sensing means that receives as its input a second fluid power signal from said fluid power supply and whose output is a fluid oscillating signal whose frequency is proportional to the temperature of said second fluid power signal, said second flueric sensing means having substantially identical characteristics as those of said first flueric sensing means.

4. The apparatus according to claim 3 further comprising first and second electrical transducing means for receiving said fluid oscillating signals from said first and second flueric sensing means, respectively, and having as their outputs first and second electrical signals.

5. The apparatus according to claim 4 further comprising means for receiving said first and second electrical signals and for providing a readout according to the detected difference therebetween.

6. The apparatus according to claim 5 wherein each of said flueric sensing means further comprises an ambient port for exhausting excess fluid to ambient.

7. The apparatus according to claim 2 wherein said containing means comprises an input port for receiving said fluid power signal from said fluid power supply;
   a reaction chamber that contains said primary reactant and receives said fluid power signal from said input port; and an output port connected to said reaction chamber for receiving the mixture of said fluid power signal and said volatile species, if any.

8. The apparatus according to claim 7 wherein said containing means further comprises a removable stopper for affecting a seal between said reaction chamber and the environment external to said containing means, said stopper also serving as means for allowing the insertion of said primary reactant into said reaction chamber.

* * * * *